United States Patent Office 2,805,569
Patented Sept. 10, 1957

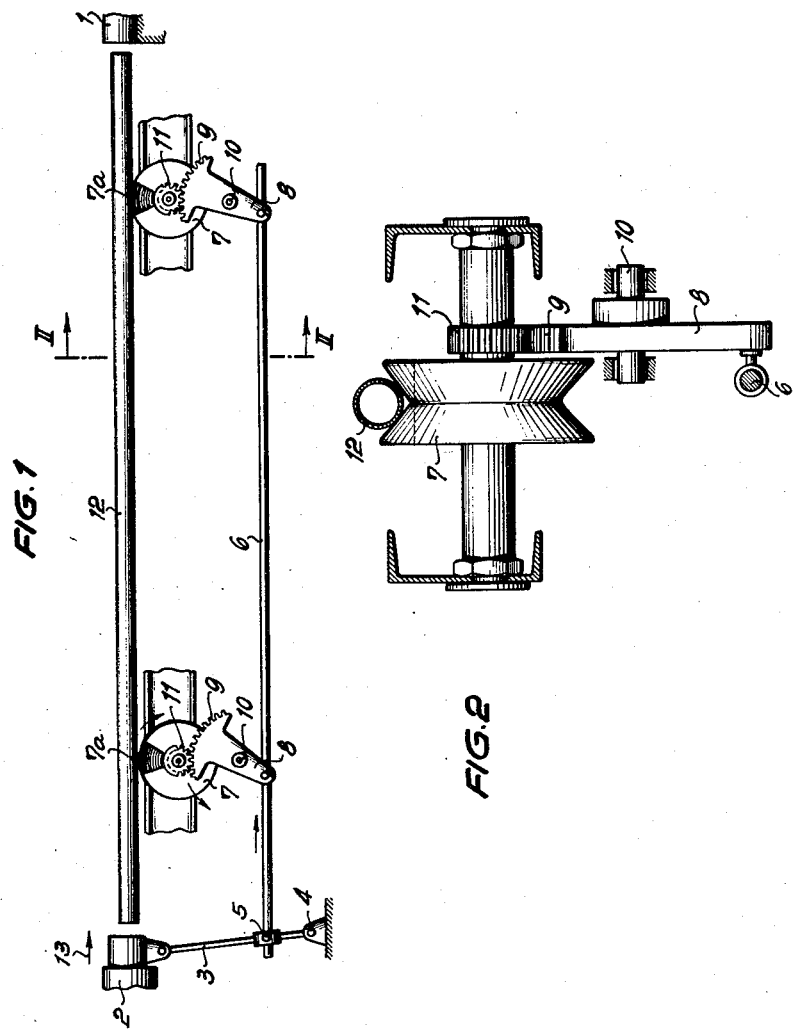

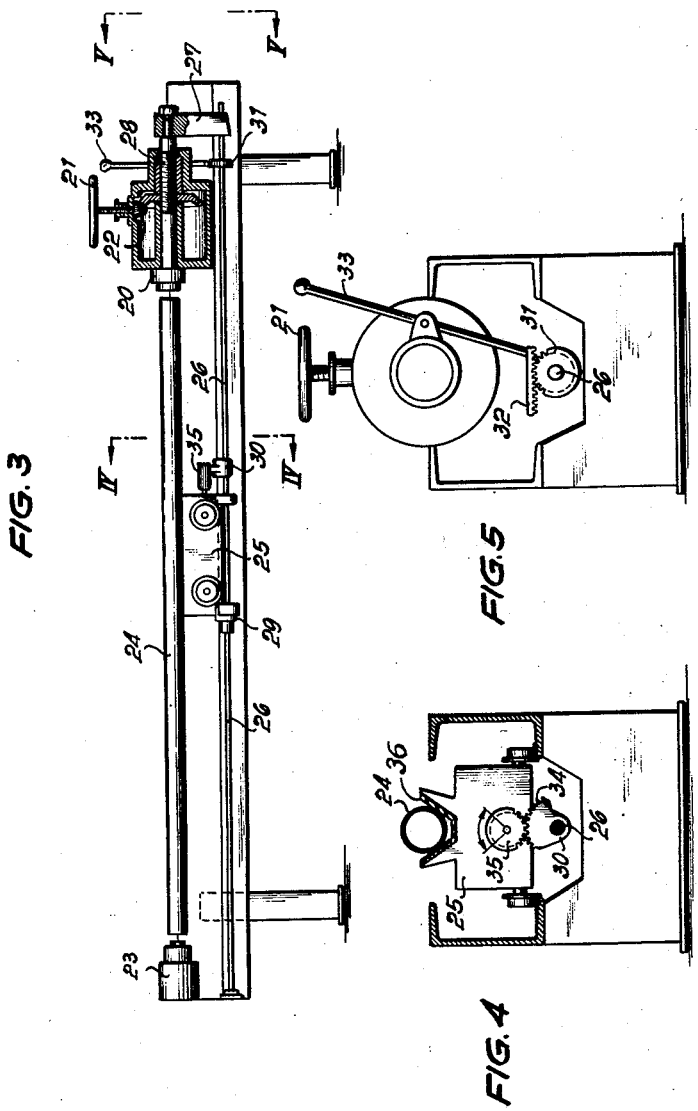

2,805,569
TUBE TESTING PRESSES

Peter Billen, Leverkusen-Kuppersteg, and Walter Dicks, Krefeld-Urdingen, Germany, assignors to Schloemann Aktiengesellschaft, Dusseldorf, Germany Application May 13, 1954, Serial No. 429,637

Claims priority, application Germany May 19, 1953

7 Claims. (Cl. 73—49.5)

In tube testing presses with a fixed testing head and a testing head capable of displacement in the direction of the tube axis it has been the practice, for the testing of tubes with magnetic reaction, more particularly steel tubes, to use electromagnets. These electromagnets have the function on the one hand of holding the tube during the test, for the purpose of preventing buckling, and on the other hand serve the purpose of transporting the tube before and/or after the test.

As water is used for the testing of tubes, which frequently wets the tube testing press, the employment of electromagnets is a source of danger to the persons carrying out the test.

The invention has among other objects that of avoiding the danger referred to and consists in this, that the tubes are held in the testing position so as to prevent buckling by holding members comprising permanent magnets. These holding members may be movable in a manner known per se for the purpose of transporting the tubes before and/or after the test.

In one constructional form of the arrangement according to the invention the holding members have the form of permanently magnetic rollers which are rotatable in dependence on the motion of the displaceable tube testing head for the purpose of transporting the tube. The movement of the tube in the axial direction is so timed that the tube, after being placed in the testing press, is moved during the forward motion of the movable test head in the same direction as the test head, but by a less amount, so that one end of the tube will come up against the fixed test head, whilst the test head moving with greater velocity will push itself over the other end. During the backward motion of the movable test head the tube will have a smaller velocity imparted to it than the test head, so that the tube will get free about simultaneously of the two test heads. The distance moved through by the tube is thus in any case less than that moved through by the test head and will preferably amount to ⅓ to ½ of that distance.

The invention further relates to the means which bring about the said different movement of the tube and the movable test head with respect to the fixed test head.

As during the whole of the operation the tube rests on permanently magnetic rollers, it must, after the operation is finished be raised from the rollers in opposition to the magnetic force. In order to enable the magnetic force to be cut out or diminished for this moment, according to a further feature of the invention magnetic transporting rollers are used, which have a non-magnetic sector. The arrangement is made such that the tube, when the testing press is in the position in which the tube is to be lifted or thrown off, rests on the non-magnetic sector of the transporting rollers. This facilitates the lifting off of the tubes. In another modified form of the invention the permanently magnetic holding member is made displaceable in the direction of the tube axis. The displacement preferably takes place in dependence on the displacement of the tube to be tested, the arrangement being such that a coupling member connecting testing head and holding member can perform a dead travel, in order that the distance travelled by the tube shall be smaller than that travelled by the test head. With the object of facilitating the lifting off of the tube, the permanent magnet is adapted to be cut out or its effect on the tube caused to cease. This putting out of action may be effected, for instance, by the interposition of a plate of silumin, an alloy consisting of aluminium 83 percent and silicon 13 percent. According to a further modification of the invention, the coupling member which couples the movable test head with the holding member can also be used for putting the permanent magnet out of operation, if it be made rotatable. The handle for turning the coupling member is preferably disposed in the region of the test head, so as to enable one person to displace the test head and to turn the bar.

Constructional examples of the arrangement according to the invention are illustrated in the accompanying drawings, in which:

Figure 1 shows a diagrammatic representation of one example,

Figure 2 a section on line I—I of Figure 1 to a larger scale,

Figure 3 a further constructional example,

Figure 4 a section on line IV—IV of Figure 3 and

Figure 5 a view of details regarded from V—V of Figure 3.

In Figures 1 and 2 the test head 1 is fixed and the test head 2 displaceable. The displacement is effected by a swing lever 3 which is supported at the fixed pivot 4. At 5 a push and pull rod 6 for the permanently magnetic holding rollers is pivotally attached. It engages with extended arms 8 of the toothed segments 9 which are rotatable about fixed centres 10. The toothed segments 9 mesh with pinions 11 which are connected rigidly with the permanently magnetic holding rollers 7. The sector 7a of the holding rollers is non-magnetic. The holding rollers 7 support the tube 12 to be tested.

When the tube 12 is being placed in position, the testing press parts are in the position shown in Figure 1, that is, the tube is placed on the non-magnetic sector of the holding rollers 7. The test head 2 is thereupon pushed forward in the direction of the arrow 13, during which the holding rollers 7 are turned by means of the rodwork in the same direction, but with a lower peripheral velocity. During this motion the tube 12 passes on to the magnetic part of the holding rollers 7. On the test head 2 being withdrawn after the completion of the test, the tube 12 will follow it, but more slowly, adhering to the magnets 7 owing to their attractive force. The magnetic force is sufficient to draw the tube 12 out of the test head 2. After the test head 2 has completed its withdrawal, the tube 12 will again be lying on the non-magnetic sector 7a, so that it can be easily removed.

In the constructional example according to Figures 3 to 5 the displaceable test head 20 is moved forwards and backwards by operating the hand spindle 21 through bevel gearing 22. The other test head 23 is fixed. Below the tube 24 to be tested is a permanently magnetic holding member 25 which is displaceable parallel to the tube 24. For its displacement there is a bar 26 which is fixed to a sliding member 27 which takes part in the motion of the test head 20, with which it is connected by way of the spindle 28. The displacing bar 26 has a stop 29 and a second stop 30. The distance apart of these stops is somewhat greater than the length of the permanently magnetic holding member 25. At the right-hand end of the testing press (Figure 3) the displacing bar 26 bears a pinion 31 (Figure 5) which can be turned by way of a rack 32 by means of a hand lever 33. The stop 30 also carries a toothed segment 34 which coacts with a pinion 35 which effects the putting into and out of operation of the permanently magnetic holding member, for instance interposes a silumin plate 36 between the magnet and the tube, by any suitable known means for converting the rotary motion of a shaft into a longitudinal movement of a slidable member engaging the shaft.

After the tube has been placed in the testing press, the test head 20 is pushed forward by turning the hand spindle 21. Before the pressure water is forced into the tube, the magnet 25 is put into operation by means of the hand lever 33. After the completion of the test the test head 20 is withdrawn. At first the holding member remains stationary, as the forward pushing bar 26 has a certain idle motion with respect to it. The test head 20 will therefore release itself from the tube 24 which is held by the permanent magnet 25. On the test head 20 continuing to move to the right, the holding member 25 will be carried along with it, as the stop 29 of the bar 26 will now strike against the holding member 25, and, as the magnet is still operative, draw the tube 24 off the fixed test head 23. Thereupon the magnet is put out of action by turning the bar 26, so that the tube is free to be lifted off or thrown out.

We claim:

1. A tube-testing press for testing magnetically responsive tubes, more particularly steel tubes, comprising: a fixed test head, a test head which is spaced away from the said fixed test head and is displaceable in the direction of the axis of the tube to be tested, at least one permanently magnetic holding member for supporting the tube to be tested and protecting it against buckling, transmission means connecting the displaceable test head with the magnetic holding member, for transporting the tube longitudinally before and after testing, the transmission means being adapted to transport the tube in both directions of the motion of the displaceable test head, and means for discontinuing the magnetic action of the holding member upon the tube while the holding member still supports the tube.

2. A tube-testing press for testing magnetically responsive tubes, more particularly steel tubes, comprising: a press frame, a stationary test head fixed to the frame, a test head spaced away from the fixed test head and so mounted on the frame as to be displaceable in the direction of the axis of the tube to be tested, permanently magnetic rollers rotatably mounted on the press frame and spaced along the longitudinal axis of the pipe so as to support the tube to be tested and to protect it against buckling, a toothed pinion coaxially secured to each magnetic roller, a lever pivotally mounted on the press frame near each toothed pinion, a toothed segment on each of the said levers, meshing with the adjacent pinion, a swing-lever pivoted to the press frame and pivotally connected at its free end to the displaceable test head, a rod pivotally connected to the swing-lever and to each of the levers carrying toothed segments, to transmit motion from the displaceable test head to the magnetic rollers, and means for discontinuing the magnetic action of the magnetic rollers upon the tube while the rollers still support the tube.

3. A tube-testing press as claimed in claim 2, wherein the rod transmitting motion from the swing-lever to the levers carrying the toothed segments is connected to the various levers at such distances from their fulcrums that the rollers will displace the tube through a distance of between one-third and one-half of the distance moved by the displaceable test head.

4. A tube-testing press as claimed in claim 2, wherein each of the magnetic rollers includes a non-magnetic sector, which is brought into engagement with the tube when it is desired to discontinue the magnetic action.

5. A tube-testing press for testing magnetically responsive tubes, more particularly steel tubes, comprising: a press frame, a stationary test head fixed to the frame, a test head spaced away from the fixed test head and so mounted on the frame as to be displaceable in the direction of the axis of the tube to be tested, a rod slidably mounted in the press frame parallel to the tube to be tested, a permanently magnetic holding member slidably mounted on the said slidable rod and adapted to support the tube to be tested and to protect it against buckling, two abutments on the slidable rod, one on each side of the holding member, spaced apart by a distance somewhat greater than the length of the holding member, manually operable means for moving the displaceable test head axially, means connecting the slidable rod with the displaceable test head so that they slide together, and means for discontinuing the magnetic action of the holding member upon the tube while the holding member still supports the tube.

6. A tube-testing press as claimed in claim 5, wherein the magnetic action of the holding member upon the tube is discontinued by inserting a plate of silumin (an alloy consisting of aluminium 83 percent and silicon 13 percent) between the holding member and the tube.

7. A tube testing press as claimed in claim 5, wherein the slidable rod is also rotatable, and the press further comprises: a pinion mounted fast on the slidable and rotatable rod, a toothed rack meshing with the pinion, a hand lever for actuating the rack, a toothed member rotatable with the slidable rod mounted on one of the abutments thereon, and a toothed pinion meshing with the said toothed member, the said toothed pinion actuating the means for discontinuing the magnetic action of the holding member upon the tube.

References Cited in the file of this patent

UNITED STATES PATENTS

| | | |
|---|---|---|
| 1,994,675 | Weckerly | Mar. 19, 1935 |
| 2,443,582 | Lendo et al. | June 15, 1948 |
| 2,448,820 | Motycka | Sept. 7, 1948 |
| 2,471,067 | Hitchcock | May 24, 1949 |
| 2,497,193 | Webb | Feb. 14, 1950 |
| 2,565,460 | Woodlief | Aug. 21, 1951 |